Dec. 18, 1956 F. N. GILLETTE 2,774,815

FILM TO VIDEO TRANSLATION APPARATUS

Filed Sept. 13, 1952

INVENTOR.
FRANK N. GILLETTE

BY H. S. Mackey

ATTORNEY.

United States Patent Office 2,774,815

Patented Dec. 18, 1956

2,774,815

FILM TO VIDEO TRANSLATION APPARATUS

Frank N. Gillette, Pleasantville, N. Y., assignor to General Precision Laboratory Incorporated, a corporation of New York Application September 13, 1952, Serial No. 309,535

3 Claims. (Cl. 178—7.2)

This invention relates to television apparatus and more particularly to apparatus for translating images recorded on motion picture film to video signals. The invention is specifically directed to a synchronizing system for insuring frequency-lock and phase-lock between the projection of images from the film frames and the vertical sync frequency and the blanking or retrace interval of the video camera tube where the signal from the sync generator constitutes the reference signal.

In systems for translating motion pictures from film strip to video cameras, it is conventional to use a cathode ray tube having a photoelectric mosaic screen having minute photoelectric elements which convert the light gradations of the minute elemental areas of the images into electrical signals. The usual video camera tube is of the storage type, that is, the gradations of light from the minute elemental areas of the image falling upon the mosaic screen causes the release and storage of electrons in the respective corresponding minute photoelectric elements. Then upon the subsequent bidimensional scanning of the mosaic screen by the electron beam, electrical signals are produced corresponding to the amount of light falling on the separate mosaic elements. The signals produced during each complete scanning cycle represent one video picture frame. Scanning cycle, as used herein, includes two interlaced fields which constitute one video picture frame.

In transferring the images from a motion picture strip to a video camera it is essential that the cathode ray scans the screen only during the time intervals when no image is being projected from the film strip. In order to reduce flicker to a practical minimum it has been standard television practice to use two interlaced fields per video picture frame. By adopting as standard 60 fields per second the usual commercial power frequency or 60 cycles per second can be used to advantage for control purposes. Interlaced fields at this frequency give 30 video picture frames per second. Since the standard motion picture projection rate is 24 pictures per second, it is necessary in a film to video translation system, to make the two picture rates compatible.

Therefore, in order to accommodate the 24 to 30 picture rate ratio, the alternate film frames may be projected on the camera tube anode during two successive scanning cycles, while the intermediate film frames are projected on the camera tube anode during three successive scanning cycles. The timing or synchronization according to the present invention is such that the light is projected through a film frame onto the camera tube anode only during a blanking or retrace interval of the scanning system. Accurate phase lock within very small limits is necessary if clear and sharp translation is to be obtained.

To insure this is the primary object of this invention.

Heretofore, systems have been proposed directed to this same objective, but they have fallen short of the goal either because they have failed to provide an accurate phase lock or they have provided a system which has practical disadvantages.

Therefore, another object is to provide an improved practical system of the type mentioned above.

Other and further objects will become apparent from the following description in connection with the accompanying drawings in which.

Figure 1:
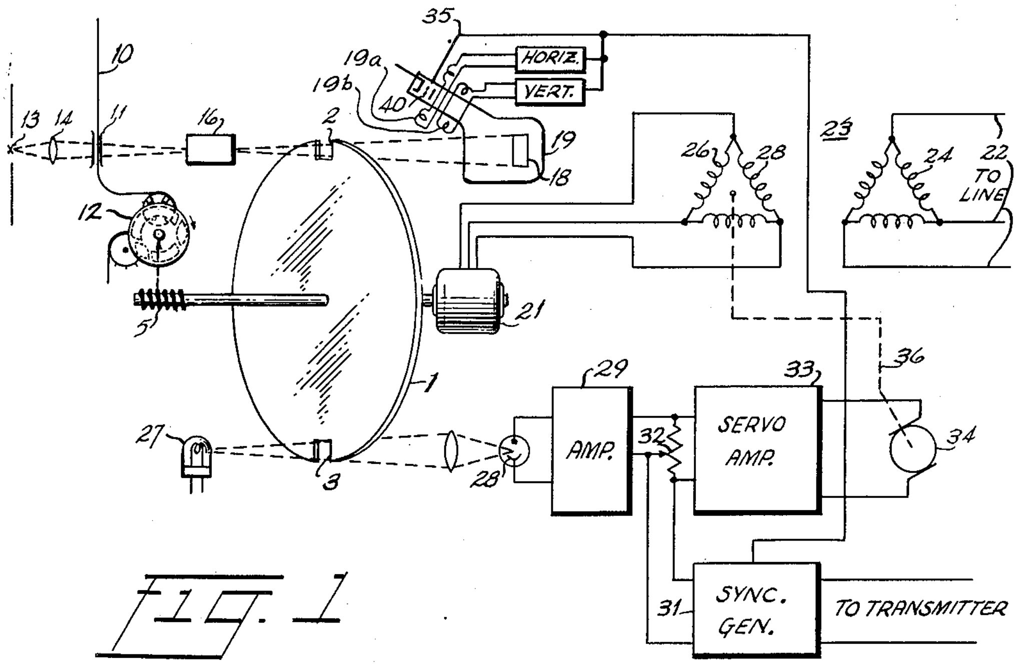
Figure 1 is a schematic illustration of one embodiment of the invention.

The basic concept of the invention is the joint utilization of synchronizing signals generated by the operation of the light shutter and signals from a controlled synchronizing generator for the video scanning means to produce a very accurate phase lock between the projection of the film frames, that is, the operation of the light shutter, and the vertical fly-back interval of the video camera tube. The signals from the synchronizing generator serve as the reference signals. In the schematic arrangement shown in the drawings for the purpose of illustrating one embodiment of the invention the cooperative relation between the essential elements of a motion picture projector and a video camera are shown. The light shutter 1 is provided with two notches, 2 and 3, either one of which controls the projection of the light through the film frames onto the video camera while the other notch controls light falling on a photocell which generates a signal which is accurately locked in time phase with the synchronizing pulses which produce the fly-back intervals.

The generated signal is compared in phase with that of the sync generator and any resultant error signal is used to alter the phase of the rotating light shutter. The phase of the rotating light shutter may be varied electrically or mechanically as hereinafter described.

A motion picture film strip 10 is adapted to pass through a film gate in front of an aperture 11 of a conventional motion picture projector, the film strip being advanced intermittently through the projection aperture by an intermittent mechanism, generally indicated at 12. Light from a suitable light source 13 is directed by means of condensing lens 14 through the projection aperture 11 and an optical projection system 16 forms an image of the film frame on the photosensitive anode 18 of a video pick-up tube 19. The video tube 19 may be of conventional construction and in the arrangement shown is of the image storage type. When the image projected from the film frame falls on the photosensitive screen 18, charges on the minute incremental areas of the screen 18 corresponding to the light shading of the image are produced and then during the subsequent scanning cycle of the video tube 19 signals corresponding to the separate charges are transmitted in the manner well known in the art. From the width of the notches 2 and 3 in the light shutter 1 as compared to the total periphery of the shutter, it will be readily apparent that the projection interval is a very small portion of the translation cycle, the images of the film frames being projected onto the video tube 19 only during the blanking or fly-back period of the latter. The intermittent mechanism 12 and the light shutter 1 are mechanically tied together by means of a speed-changing mechanism 5 having a ratio of 1 to 2½ to accommodate the 30 to 24 picture rate ratio and are driven by a suitable motor 21 preferably of the polyphase type. The intermittent mechanism 12 may be of the 2–3 type for projecting 24 film frames per second, as described in Bedford Patent No. 2,083,093, dated June 1, 1937. Since the shutter 1 has two notches 2, 3, it is driven at 1800 R. P. M. to give a projection rate of 3600 per minute, corresponding to the vertical sweep rate of the camera pick-up tube 19. With drive ratio of 1 to 2½ the intermittent 12 will be rotated to impart intermittent movement to the film 10 at the rate of 24 pictures per second.

The motor 21 is energized from a source of siutable alternating current of commercial frequency represented by the input conductors 22 through a transformer 23, the phase relation between the primary 24 and the secondary 26 of which, can be varied in accordance with the relaitve phase between a signal generated by the operation of the light shutter 1 and the blanking signal on the video tube 19 in a manner hereinafter described.

To this end, a small lamp 27 is provided for projecting light through one of the slots 2, 3 of the light shutter onto a photoelectric cell 28. The alternate projection of light through the notches 2 and 3 onto the photoelectric cell 28 produces electrical pulses in the latter which signals are suitably amplified in amplifier 29. In the embodiment illustrated, the notches 2 and 3 are diametrically opposed so that the passage of light from lamp 27 onto the photoelectric cell 28 chronologically coincides with the projection of an image from the film strip 10 onto the mosaic anode of the video tube 19. It will be readily apparent to those skilled in the art that it is not absolutely essential that the notches 2 and 3 be diametrically opposed but they may be otherwise appropriately arranged so long as there is a fixed relation between them in order to produce a signal which can be compared with the blanking signal pulse. As a matter of fact a single notch could be used with a portion of the light representing the projected image from the film strip being used to activate the photoelectric cell 28. It will be readily apparent that if the two notches are not diametrically opposed or if only one notch is used, other appropriate adjustments would be necessary in order to carry out the operations hereinafter described.

The video camera tube 19 is provided with deflection means, such as coils 19*a* and 19*b*, for deflecting the electron beam horizontally and vertically, respectively, in order to scan the mosaic anode 18. A synchronizing generator 31, is provided for supplying the coils 19*a* and 19*b*, respectively, with sawtooth pulses of the proper frequencies through suitable amplifiers so as to scan the screen 18 from top to bottom 60 times per second in conventional manner. The generator 31 also supplies the appropriate blanking signal through a conductor 35 to the control grid 40 of the tube 19 during the vertical retrace interval. The synchronizing generator 31 is locked to the frequency of the local power source 22 in conventional manner and then this becomes the synchronizing frequency for the video transmitter.

The same synchronizing pulses which are supplied through the conductor 35 to the grid 40 of the video tube are also supplied through suitable conductors to a mixing circuit which includes a resistor 32 connected to the input of a servo amplifier 33. The output of amplifier 29 which is the amplified signal generated by the operation of the light shutter 1, is supplied to one-half of the resistor 32 and the output signal from the synchronizing generator 31 is supplied to the other half of the resistor 32. The potentials from the synchronizing generator 31 and the amplifier 29 are adjusted to be equal and opposite and if they are not exactly in phase, an error signal will be supplied to the input of the servo amplifier 33. This error signal, after amplification in the servo amplifier 33 is used to operate a motor 34 which through the mechanical connection 36 causes an adjustment of the power transformer 23 which energized the projector motor 21. Preferably the transformer 23 is a form of synchro having a polyphase rotor and stator and is so constructed that the position of the stator may be adjusted by operation of the motor 34. The motor 34 is so designed and connected as to be sensitive to the relative phase between the resultant signal voltage supplied to the resistor 32 by the synchronizing generator 31 and the amplifier 29 so that the motor 34 will adjust the secondary stator winding 26 relative to the primary rotor winding 24 to advance or retard the phase of the alternating current supplied to the motor 21 to lock the projection of the images onto the anode 18 in exact phase with the fly-back or retrace interval of the camera tube 19. In this way any difference in phase or synchronism between the projection of the image from the film strip 10 of the video tube 19 and the occurrence of the vertical sync signals will cause the motor 34 to operate to properly adjust the phase of the power supplied to the motor 21 to advance or retard the light shutter 1. Preferably the motor 21 is a synchronous motor and the power furnished by the motor 34 will be only that small amount which is necessary to adjust the phase of the power source a few degrees.

Figure 2:
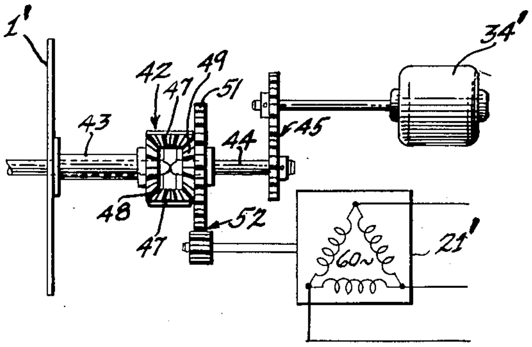
Figure 2 illustrates a modified form of one part of the system which makes it possible to accomplish the same result using a mechanical differential as distinguished from the electrical differential of the first embodiment.

The control system described above constitutes an electrical differential but if desired, a mechanical differential may be used to accomplish a similar result. For example, referring to Fig. 2, it will be noted that instead of the synchro 23 for varying the phase of the power supplied to the motor 21 to effect the phase-lock, a suitable mechanical differential 41 may be interposed between the motor 21′ and the light shutter disk 1′. The motor 21′ is preferably a synchronous motor energized from the local commercial source which is also used to energize and control the synchronizing generator 31. The shutter disk 1′ is connected to a sleeve 43 on shaft 44. The latter is driven by motor 34′ through a gear train 45.

The motor 21 is the main driving motor and motor 34 supplies supplementary power through the differential 42 to advance or retard the phase of the disk 1′.

The spider of the differential 42 on which the intermediate bevel pinions 47 are rotatably mounted, is fixed to the shaft 44. An output bevel pinion 48 is fixed to the sleeve 43 on which the shutter 1′ is mounted and an input bevel pinion 49 is fixed to a spur gear 51 which is part of a gear train 52 driven by the motor 21′. Preferably the gear train 45 between the shaft 44 and the phasing motor 34′ is nonreversible so that the shaft 44 will remain in any angular position to which it is driven by the phasing motor 34′. During operation, assuming that the shutter 1′ is operating so that the projection of images on the camera tube 19 is exactly in phase with the fly-back retracing interval of the camera tube 19, the motor 34′ and the spider of the differential 42 will remain stationary and the motor 21′ will drive the shutter 1′ through the gear train 52, the differential bevel pinions 47, 48, 49 and the sleeve 43. In a manner analogous to that described in connection with the previous embodiment, a phasing error signal applied to the motor 34′ will cause the position of the spider of the differential 42 to be rotated one way or the other to advance or retard the position of the disk 1′ relative to the gear 51 and the shaft of the main driving motor 21′ to again bring the projection interval and the retrace interval into exact phase.

One of the salient features of the present invention is the arrangement for providing that the images from the film frames are projected from the film strip to the video pick-up camera only during the retrace interval of the pick-up tube in a system where the reference signal is that generated by the sync generator. There have been other systems where the sync signal has been generated by the operation of the projector. In other words, in the present invention the projection interval is locked to the vertical sync signal of the video system instead of the sync signal being locked to the projection interval.

What is claimed is:

1. In film to video translating apparatus, a video camera pickup tube having a photosensitive mosaic screen and means for producing a focused electron beam for scanning said screen to translate images thereon into electrical video signals, a source of alternative current, means synchronously operated by said alternating current source for cyclically scanning said electron beam over said screen at a horizontal frequency which is high as compared to the vertical scanning frequency to thereby give successive picture fields separated by fly-back intervals at one picture rate, motion picture projection means including means for intermittently advancing a motion picture film strip at a second picture rate, means for projecting images from said film strip on to said camera screen including a source of light and light-interrupting means, means for operating said intermittent means and said light-interrupting means in synchronism including a synchronous motor operating from said source of alternating current, means responsive to the operation of said light-interrupting means for generating electrical control pulses at a frequency which is a function of said first picture rate, means for comparing the time phase of said cyclically scanning means with said generated control pulses and means responsive to the comparison of the phase of said control pulses with the phase of said cyclically scanning means for advancing or retarding the phase of the alternating current supplied to said motor.

2. In film to video translation apparatus, a video camera pickup tube having a photosensitive mosaic screen and means for producing a focused electron beam adapted to scan said screen for translating images from said film strip into electrical video signals, a source of alternating current, means for cyclically scanning said electron beam bidimensionally over said screen at a given rate in terms of picture frames per second, each picture frame being composed of two horizontal scanning intervals separated by a vertical fly-back interval, said scanning means including a synchronizing generator for generating signals synchronized with said source of alternating current for energizing said scanning means, means for intermittently advancing a motion picture film strip having individual film frames at a second picture rate, means operated synchronously with said intermittent means for projecting images from said film strip on to said camera tube screen including a source of light and light-interrupting means, a synchronous motor operated at synchronous speed from said alternating current source for operating said advancing means and said light-interrupting means, means responsive to the operation of said light-interrupting means for generating electrical control pulses having a fixed time phase with respect to the projection intervals a phase-adjusting transformer between said alternating current source and said synchronous motor and means jointly responsive to said control pulses and the synchronizing signals from said synchronizing generator for adjusting said transformer to alter the phase of the alternating current supplied to said motor so that the projection of images from said film strip occurs only during the vertical fly-back intervals.

3. The combination in a film to video translation apparatus as set forth in claim 2, in which said light interrupting means comprises a disc having two spaced transparent areas, one of which is adapted to permit light to project from said film to said camera tube screen while the other of said transparent areas permits a light beam to fall simultaneously on a photoelectric cell for generating control signals having a time phase fixed with respect to the projection intervals, and in which said jointly responsive means includes means for comparing said generated control pulses with the synchronizing pulses from said synchronizing generator for producing a resultant signal error and servo means responsive to said error signal for controlling said transformer to vary the phase of the alternating current supplied to said motor.

References Cited in the file of this patent

UNITED STATES PATENTS

| | | |
|---|---|---|
| 2,082,093 | Bedford | June 1, 1937 |
| 2,455,323 | Townsend | Nov. 30, 1948 |
| 2,523,156 | Somers | Sept. 19, 1950 |
| 2,525,891 | Garman et al. | Oct. 17, 1950 |
| 2,530,516 | Finch | Nov. 21, 1950 |
| 2,543,787 | Long | Mar. 6, 1951 |
| 2,600,868 | Hales | June 13, 1952 |
| 2,625,602 | Somers | Jan. 13, 1953 |
| 2,630,495 | Wise | Mar. 3, 1953 |